United States Patent [19]
Cassani

[11] Patent Number: 6,059,359
[45] Date of Patent: May 9, 2000

[54] BICYCLE SADDLE

[76] Inventor: Osvaldo Cassani, Via Castallana, 36, Riese Pio X, Italy, 91039

[21] Appl. No.: 09/200,809

[22] Filed: Nov. 27, 1998

[51] Int. Cl.[7] ....................................................... B60N 2/38
[52] U.S. Cl. .................................... 297/195.1; 297/219.11
[58] Field of Search ................................ 297/195.1, 214, 297/215.16, 219.11

[56] References Cited

U.S. PATENT DOCUMENTS

| 3,756,653 | 9/1973 | Worley | 297/215.16 |
| 4,319,781 | 3/1982 | Tsuge | 297/214 |
| 4,451,083 | 5/1984 | Marchello | 297/219.11 |
| 5,348,369 | 9/1994 | Yu | 297/195.1 X |
| 5,397,162 | 3/1995 | Huang | 297/195.1 |
| 5,558,396 | 9/1996 | Yu | 297/195.1 X |

*Primary Examiner*—Peter M. Cuomo
*Assistant Examiner*—Stephen Vu
*Attorney, Agent, or Firm*—Morse, Altman & Martin

[57] ABSTRACT

A bicycle saddle including a narrow nose, a wide seat, and a transition region in between. The components of the saddle are a base, a pad, and a cover. The base provides that saddle with rigidity. The pad provides resilient support to the rider. The underside of the pad is provided with grooves, giving the pad greater compressibility in the area of the grooves only. The cover includes a seat cover and a nose cover, which are stitched together. The nose cover is composed of a more flexible material than the seat cover to accommodate the increased compressibility of the nose portion of the pad.

9 Claims, 3 Drawing Sheets

BICYCLE SADDLE

BACKGROUND OF THE INVENTION

1. Field of the Invention

The present invention relates to bicycles, more particularly, to bicycle saddles that help to alleviate physiological problems associated with prolonged bicycle riding.

2. The Prior Art

The typical bicycle saddle consists of a base, a resilient pad, and a cover. The base, which is generally plastic, acts to impart rigidity and form to the saddle, the pad provides resilient support to the rider, and the cover provides a soft surface and protects the pad.

In men, the pressure from sitting on a bicycle saddle for long periods of time may bruise or damage the structures of the perineum between the scrotum and the anus. This pressure may bruise a nerve called the ilioinguinal nerve, which is the sensory nerve supply to the scrotum and penis. This neuropraxia, or nerve bruising, will cause numbness and, in extreme cases, can cause impotence.

The typical solution for avoiding neuropraxia is to stand up or shift position in the saddle from time to time. However, it is not always possible to stand or shift on a regular basis, particularly in race conditions or simply because the rider does not remember to do so.

There are two basic solutions to the problem involving the design of the saddle. The first is to remove the section of the saddle along which the ilioinguinal nerve runs so that weight cannot be put on that portion of the perineum. Implementations of this solution include removing the entire nose of the saddle or removing only a portion of the nose of the saddle. As to the former, the disadvantages include more difficulty in maintaining balance on the saddle and a lose of "feel" of the bicycle. The latter is accomplished either by forming a hole in the saddle or by splitting the saddle lengthwise down the middle so that there is a gap in the saddle where the ilioinguinal nerve runs. In either case, direct support for that portion of the perineum is lost; support is provided indirectly by the sides of the nose.

The second solution involving the saddle is to use additional padding or to vary the density of the padding. When additional padding is put in the nose, the rear must also be built up. The result is that the distribution of the rider's weight is not appreciably different than with a saddle without extra padding. The padding density can be varied by using different materials for different portions of the saddle, such as air, gel, or foams of different densities, or a single piece of foam is manufactured so that its density decreases from the seat to the nose. However, the cost to manufacture such a saddle is much greater than that of typical single-density saddles.

SUMMARY OF THE INVENTION

An object of the present invention is to provide a bicycle saddle that reduces pressure on the perineum in a manner that is simple to implement.

The saddle of the present invention includes a narrow nose at the front, a wide seat at the rear, and a transition region in between. The main components of the saddle are a base, a pad, and a cover. The base is a molded plastic component that provides that saddle with rigidity. The base is generally rounded with downwardly-extending walls.

The pad provides resilient support to the rider. It is typically composed of a polyurethane foam and is contoured to rest on top of the base. The pad has three portions, a wide seat pad at the rear, the narrow nose pad at the front, and transition portion in between. The seat pad is wide enough to support the weight of the rider while the rider remains balanced. It is of a density and elasticity that is adequate to absorb a portion of the shock derived from the terrain over which the bicycle is traveling.

The nose pad permits the rider to "feel" the bicycle, contributing to the how rider controls the bicycle, and does not need to support the rider's weight. The primary aspect of the present invention is how to provide the rider with the "feel" while putting minimal pressure on the perineal region. The saddle of the present invention includes a set of grooves on the underside of the nose pad. The grooves give the pad greater compressibility in the area of the grooves. The ribs between the grooves provides support so that the pad does not sag in the area of the grooves. When the rider sits on the saddle, the ribs collapse into the grooves.

One set of parameters that contributes to the density and feel of the nose pad relates to the size of the groove and include the width and depth of the groove and the width of the rib. As the width and/or depth of the groove increases and/or the width of the rib decreases, the density of groove portion of the pad decreases. The present invention contemplates that grooves may vary in size in the a single saddle.

The shape of the groove also contributes to the feel. The most preferred shape is a chevron or "V". Other contemplated shapes include curved and straight, either transverse or longitudinal. The chevron is the most preferred shape because it provides the greatest amount of stability to the pad. The angle in the center of the chevron groove prevents the groove from collapsing away from the chevron, so the direction of collapse is predictable. On the other hand, a pad with straight grooves, particularly longitudinal straight grooves, may not compress directly downwardly, possibly causing the saddle to feel like it has shifted laterally. Additionally, the direction of shift may vary. The amount of shift depends on the size of the groove, where the wider and/or deeper the groove, the greater the chance there is for shifting and the greater affect the shifting will have on the feel.

Alternatively, a chevron is replaced by a pair of mirrored diagonal grooves. The present invention also contemplates that there may be a combination of different groove shapes in one saddle.

The extend of the grooves' coverage includes the number of grooves and the length of the grooves. They necessarily extend over the area of the perineal region. However, this area may vary depending upon the purpose and design of the saddle. Typically, the grooves extend from near the front of the nose to a short distance into the transition portion, and are long enough to extend most of the way across the nose and increase in width toward the seat.

The cover provides a soft surface and protects the pad. It is typically a thin sheet stretched over the pad and base, where the entire edge is secured to the underside of the base, typically by cementing or stapling. The cover has two components, the seat cover and the nose cover, which are stitched together. The seat cover is composed of a slightly elastic rubberized material or leather. The outer surface of the non-leather seat cover is stippled or dimpled to provide a non-skid surface. The nose cover is composed of a more flexible material than the seat cover. The grooves in the nose pad make it more compressible, so the nose cover must be more flexible in order to deform the full extent of the nose pad.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION

Figure 1:
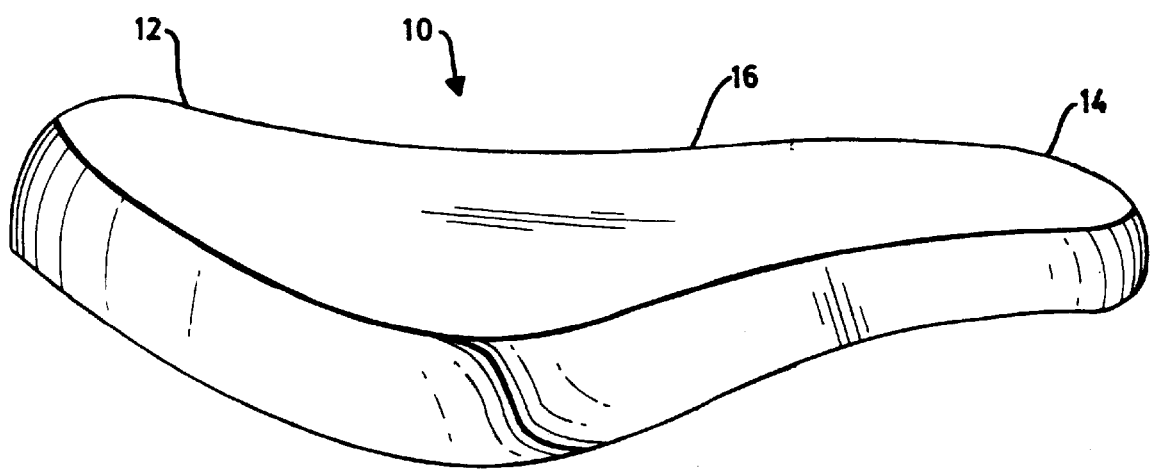
FIG. 1 shows a perspective view of a saddle of the present invention.
Figure 2:
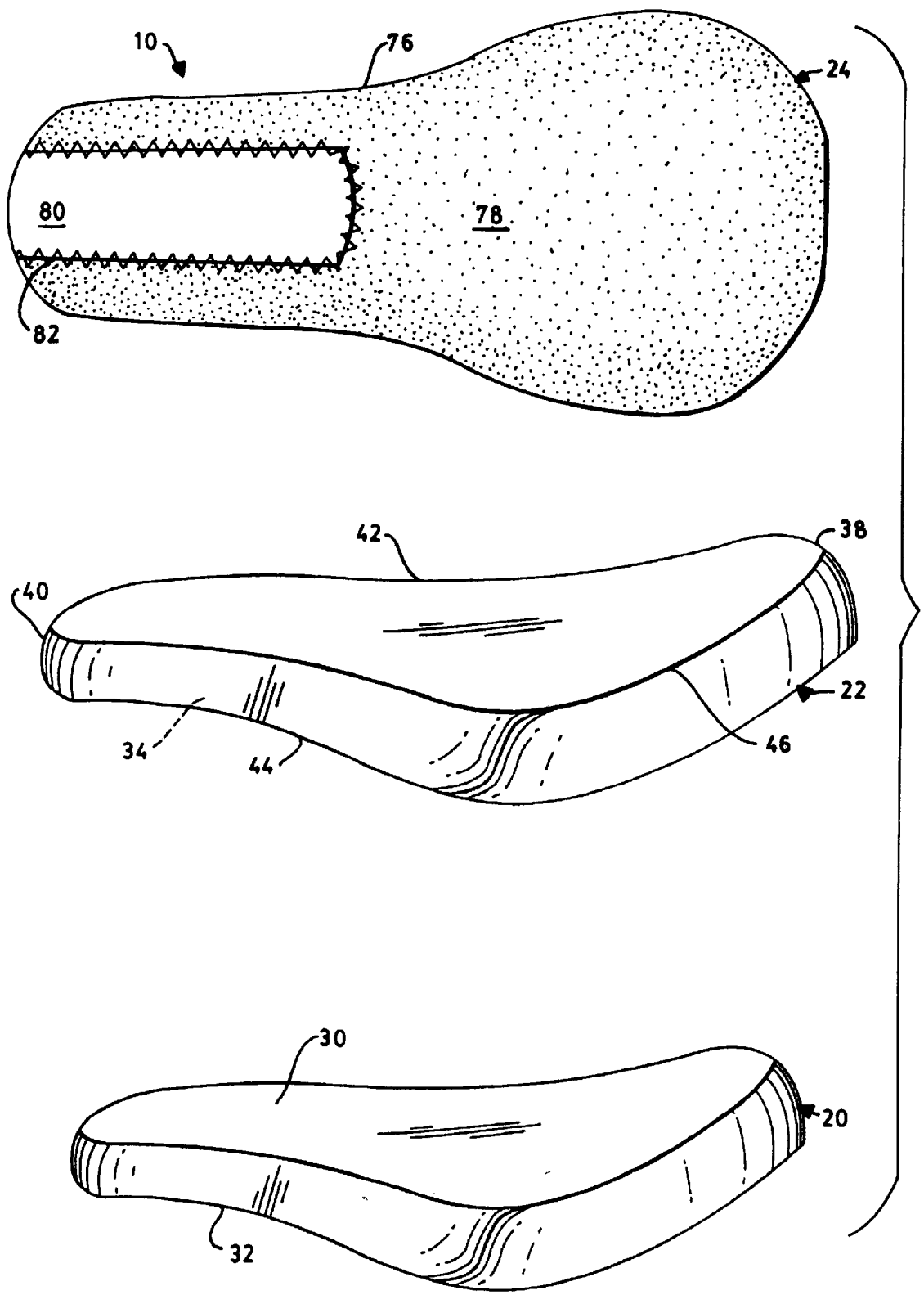
FIG. 2 shows an exploded view of the saddle of the present invention.

The saddle 10 of the present invention is shown in FIG. 1. The typical saddle of the present invention includes a narrow nose 14 at the front of the saddle 10, a wide seat 12 at the rear of the saddle 10, and a transition region 16 that curves from the width of the nose 14 to the width of the seat 12. The components of the saddle 10, shown in FIG. 2, include a base 20, a pad 22, and a cover 24. Optionally, the saddle 10 includes other components, such as rails for mounting the saddle 10 to a bicycle and a protective bottom cover.

The base 20 imparts rigidity, support to the pad 22, and a general shape to the saddle 10. It is composed of a molded plastic and has a generally horizontal upper surface 30 with downwardly extending side walls 32. The base 20 is generally rounded, without sharp angles that could damage the pad 22.

The pad 22 provides resilient support to the rider. The pad 22 is typically composed of a polyurethane foam, but other compressible materials are contemplated by the present invention. The pad 22 rests on top of the base 20, where the undersurface 34 of the pad 22 is contoured to fit on the upper surface 30 of the base 20. Typically, the pad 22 is glued to the base 20.

The pad has three portions, the wide seat pad 38 at the rear of the saddle 10, the narrow nose pad 40 at the front of the saddle 10, and transition portion 42 in between, all equivalent to the sections of the saddle 10. The under surface 34 of the pad 22 typically has a downwardly extending lip 44 that extends adjacent to the side walls 32 of the base 30.

The seat pad 38 and the nose pad 40 have different functions and are designed accordingly. The seat pad 38 supports the weight of the rider. To perform this function, it is wide enough for the rider to sit and remain balanced, and is contoured for comfort by rounding the upper edges 46. The seat pad 38 is of a density and elasticity that is adequate to absorb a portion of the shock derived from the terrain over which the bicycle is traveling. The actual density and elasticity depends upon the use for which the saddle 10 is designed. For example, a saddle designed for use on a mountain bicycle may have a seat pad that is less dense and more elastic than a saddle designed for use on a road bicycle because of the rougher terrain a mountain bicycle typically traverses and the need to absorb more shock.

The nose pad 40 permits the rider to "feel" the bicycle, contributing to the how rider controls the bicycle. The nose pad 40 does not need to support the rider's weight. The primary aspect of the present invention is how to provide the rider with the "feel" while putting minimal pressure on the perineal region.

As described above, one solution is to provide a pad of lower density at the perineal region than at the rear of the pad where the rider's weight is supported. The density of a foam pad depends upon the number and size of microscopic gas bubbles formed in the solid foam material as the foam is made. The larger the size and/or the greater the number of bubbles, the less dense and more compressible the foam. When the foam is compressed, the walls of the bubbles collapse, reducing the volume of the foam and raising the gas pressure in the bubbles. When the compression force is released, the gas returns to its ambient pressure, restoring the bubble to its normal size and the foam to its original shape.

Figure 3:
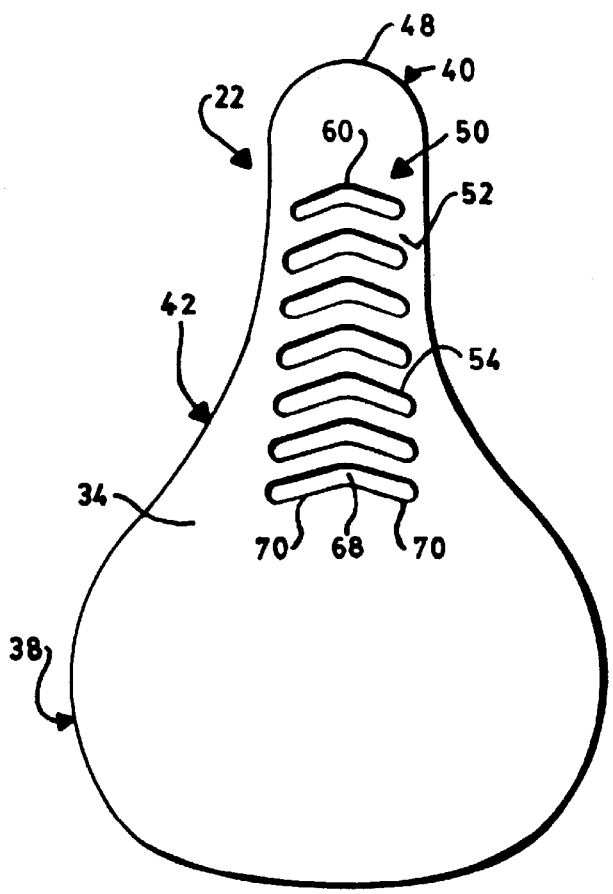
FIG. 3 shows a bottom view of the pad of FIG. 2 with chevron grooves.

The solution contemplated by the present invention is to provide the underside 34 of the pad 22 with a set of grooves 54 in groove area 50, as in FIG. 3. The grooves 54 are similar to the bubbles in that it gives the compressed foam someplace to be compressed into. The ribs 52, the parts of the pad 22 that separate the grooves 50, provides support so that the pad 22 does not sag in the groove area 50. When the rider sits on the saddle, the foam pad 22 is compressed downwardly. In the case of some riders, the nose pad 40 is also compressed transversely. The ribs 52 collapse into the grooves 54, reducing the volume of the foam. When the rider gets off the saddle 10, the gas in the bubbles returns to its ambient pressure, restoring the foam pad 22 and the grooves 54 to their original shape.

There are several groove parameters that contribute to the density and feel of the nose pad 40. The first set of parameters relates to the size of each groove 54 and include the width and depth of the groove 54 and the width of the rib 52. As the width of the groove 54 increases and/or the width of the rib 52 decreases, the density of that part of the pad 22 where the grooves 50 are located decreases, because there is more space for a smaller amount of foam to collapse into. The same is true as the depth of the groove 54 increases. Preferably, the width of the groove 54 is in the range of approximately 50% of the width of the rib 52 to approximately 200% of the width of the rib 52. Preferably, the depth of the groove 54 is in the range of approximately 20% of the thickness of the pad 22 to approximately 80% of the thickness of the pad 22.

The present invention also contemplates that the grooves 54 of a single saddle are a variety of sizes and depths. For example, the front grooves may be shallower than the rear grooves because the pad is thinner in the front. Or the grooves gradually increase in size from front to rear if, for example, more compressibility is needed toward the rear.

Figure 4:
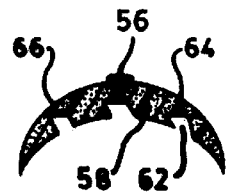
FIG. 4 shows a cross-sectional end view of the pad of FIG. 2 with compressed longitudinal straight grooves.

The next groove parameter is the shape of the groove 54. The most preferred shape is a chevron or "V", as in FIG. 3, where the center 60 of the chevron points toward the front 48 of the pad 22. Other contemplated shapes include curved, where the convex side points toward the front of the pad, and straight. Straight grooves may run transversely across the pad 22, longitudinally along the pad 22, or diagonally. The chevron is the most preferred shape because it provides the greatest amount of stability to the pad 22. A pad with straight grooves, particularly longitudinal straight grooves, may not compress directly downwardly, as shown in FIG. 4, because the rib 58 may shift when compressed so that the outer opening 62 of the groove 56 is not aligned with the inner floor 64 of the groove 56. This can cause a bulge 66 of pad foam to the side of the inner floor 64, and cause the saddle to feel like it has shifted laterally. Additionally, the saddle may sometimes shift in one direction and other times shift in the opposite direction, and may also shift directions dynamically as the rider pedals and weight shifts from one side of the saddle to the other. This shifting can affect the "feel" of the bicycle, an important aspect of a saddle. The amount of shift, and whether the shift will be significant, depends on the size of the groove. The wider and/or deeper the groove, the greater the chance there is for shifting and the greater affect the shifting will have on the feel.

On the other hand, the longitudinal straight groove provides superior transverse compressibility.

There is a greater stability inherent in the chevron shape. The angle 68 in the center of the chevron groove prevents the groove from collapsing in the direction toward the front 48 of the saddle 10, so that the direction of collapse is predictable. And the diagonal legs 70 provide a significant amount of transverse compressibility, although not as superior as the longitudinal grooves.

Figure 5:
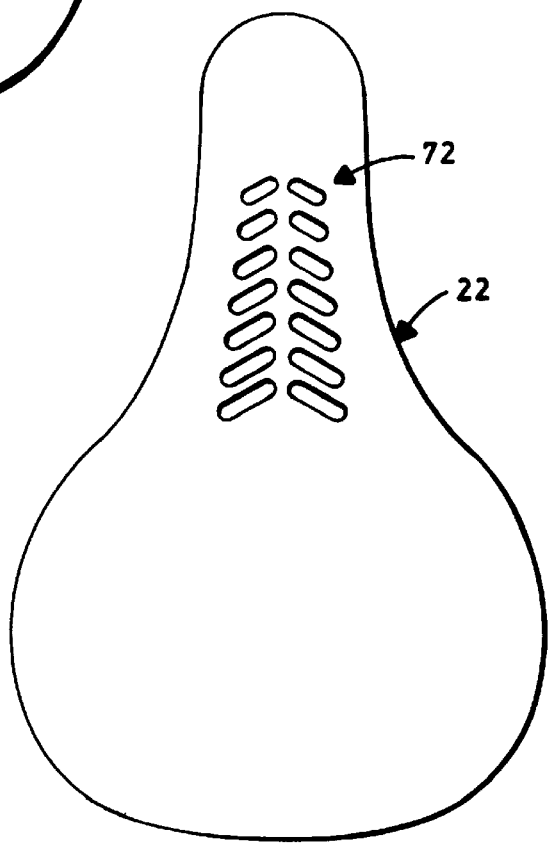
FIG. 5 shows a bottom view of the pad of FIG. 2 with mirrored diagonal grooves.

An alternative to the chevron is a pair of mirrored diagonal grooves 72, as in FIG. 5. In this arrangement, the density is slightly higher, but there is a lesser chance of that the grooves 72 will collapse toward the rear of the saddle 10.

The present invention also contemplates that there may be a combination of different groove shapes. For example, the center grooves may be chevrons and the end grooves are straight and transverse.

The final parameter is the area over which the grooves 50 extend, which includes the number of grooves 54 and the length of the grooves 54. The groove area 50 necessarily extends over the area of the perineal region. However, this area 50 may vary depending upon the purpose and design of the saddle 10. Typically, the groove area 50 extends from near the front 48 of the nose 40 and into, a possibly through, the transition portion 42. The grooves 54 are long enough to extend most of the way across the nose 40 and increase then decrease in width toward the seat 38.

The cover 26 provides a soft surface and protects the pad 24 from wear and tear. It is typically a thin sheet that is stretched over the pad 24 and base 22. The entire edge 76 of the cover 24 is secured to the underside of the base 20. There are several methods known in the art to secure the cover 24 to the base 20, including cementing and stapling. The cover 24 has two components, the seat cover 78 and the nose cover 80, which are stitched together, as at 82.

The seat cover 78 is composed of a slightly elastic rubberized material. Alternatively, the seat cover 78 is composed of leather. The outer surface of the non-leather seat cover 78 is stippled or dimpled to provide a non-skid surface so that the rider does not slide around on the saddle 10.

The nose cover 80 is composed preferably of a soft vinyl or leather. The nose cover 80 needs to be more flexible than the seat cover 78 because of the nature of the present invention. The groove area 50 is more compressible than the rest of the pad 22. Consequently, the nose cover 80 must be more flexible in order to deform the full extent of the groove area 50. The nose cover outer surface may be smooth, or it may be slightly pebbled or grained. There is no need to make the surface non-skid because, since the rider's weight is carried on the seat 12, there is little body weight on the nose 14.

Thus it has been shown and described a bicycle saddle which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. A bicycle saddle having a nose, a seat, and a transition region therebetween, said saddle comprising:
   (a) a base including a generally horizontal upper surface and downwardly-extending side walls;
   (b) a resilient pad mounted atop said base and having a pad nose portion, a pad seat portion, and a pad transition portion therebetween, said pad having an undersurface including a plurality of grooves separated by ribs and covering a groove area extending from said pad nose portion to at least said pad transition portion each of said grooves having a depth of between approximately 20% and approximately 80% of the thickness of said pad adjacent to each of said grooves; and
   (c) a flexible cover extending entirely over said pad and secured to said base.

2. The bicycle saddle of claim 1 wherein each of said grooves has a width between 50% and 200% of the width of said ribs adjacent to each of said grooves.

3. The bicycle saddle of claim 1 wherein a majority of said grooves have a chevron shape.

4. The bicycle saddle of claim 1 wherein said pad is composed substantially of polyurethane foam.

5. The bicycle saddle of claim 1 wherein said cover includes a cover nose portion and a cover seat portion, said cover nose portion covering at least a majority of the upper surface of said pad adjacent to said groove area, said cover nose portion being softer and more flexible than said cover seat portion.

6. The bicycle saddle of claim 5 wherein said cover nose portion and said cover seat portion are stitched together.

7. A bicycle saddle having a nose, a seat, and a transition region therebetween, said saddle comprising:
   (a) a base including a generally horizontal upper surface and downwardly-extending side walls;
   (b) a resilient pad mounted atop said base and having a pad nose portion, a pad seat portion, and a pad transition portion therebetween, said pad being composed substantially of polyurethane foam, said pad having an undersurface including a plurality of grooves separated by ribs and covering a groove area extending from said pad nose portion to at least said pad transition portion;
   (c) a flexible cover extending over the entirely of said pad and secured to said base; and
   (d) a majority of said grooves having a chevron shape.

8. The bicycle saddle of claim 7 wherein each of said grooves has a depth between 20% and 75% of the thickness of said pad adjacent to each of said grooves and wherein each of said grooves has a width between 50% and 200% of the width of said ribs adjacent to each of said grooves.

9. The bicycle saddle of claim 7 wherein said cover includes a cover nose portion and a cover seat portion, said cover nose portion covering at least a majority of the upper surface of said pad adjacent to said groove area, said cover nose portion being softer and more flexible than said cover seat portion, said cover nose portion and said cover seat portion being stitched together.

* * * * *